June 22, 1965     B. L. JOHNSON     3,189,950
CONNECTING STRUCTURE FOR TIMBERS
Filed Nov. 29, 1961     2 Sheets-Sheet 1
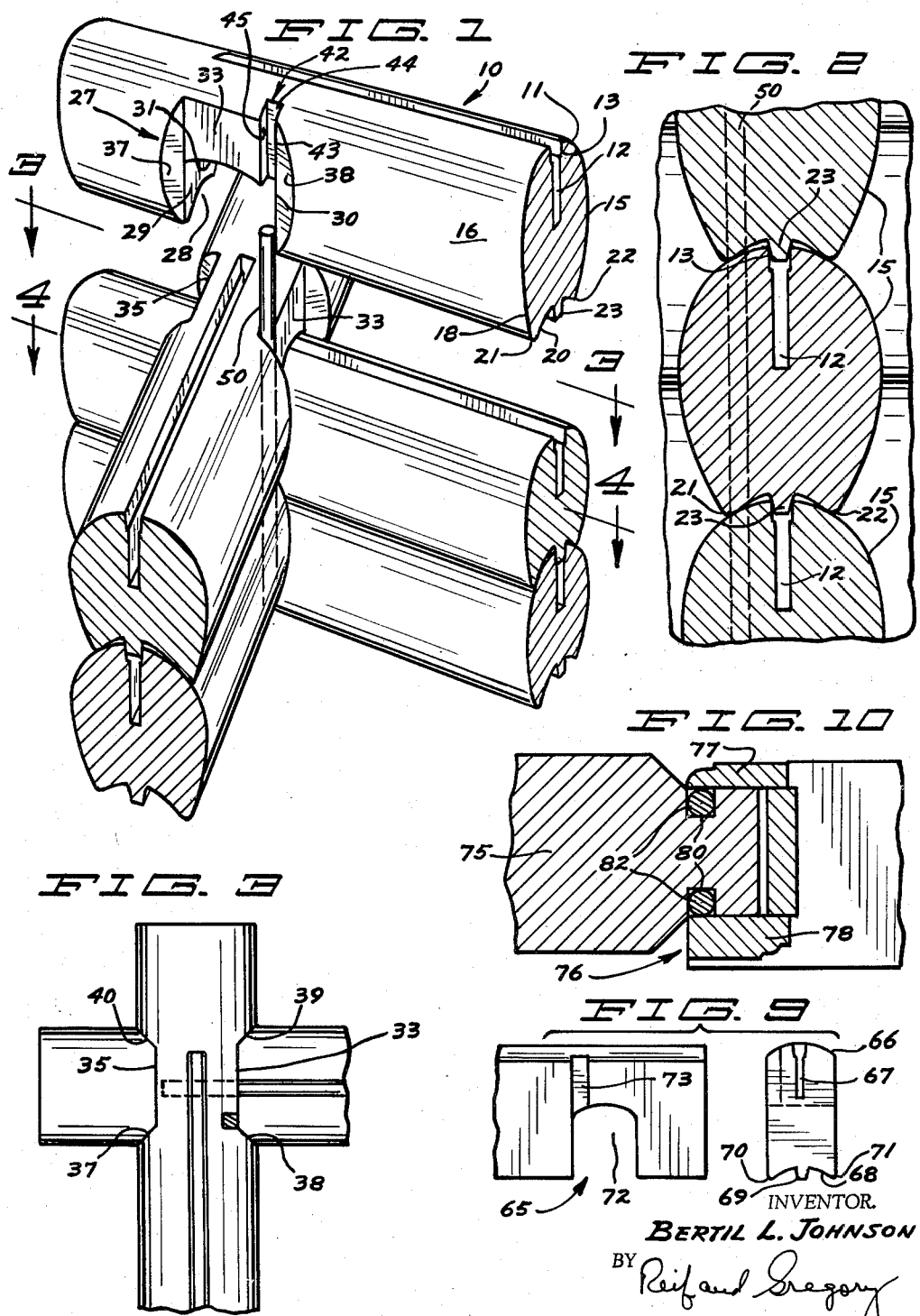
INVENTOR.
BERTIL L. JOHNSON
BY Reif and Gregory
ATTORNEYS

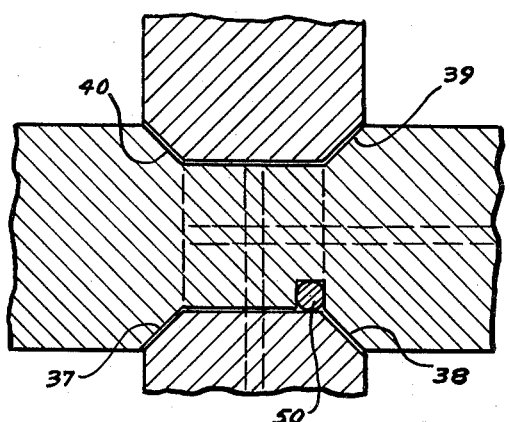
FIG. 4
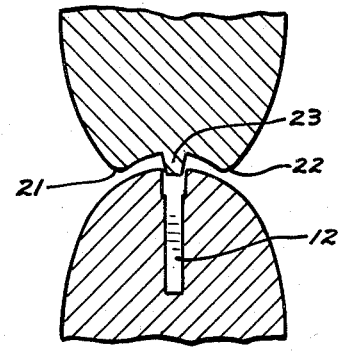
FIG. 5
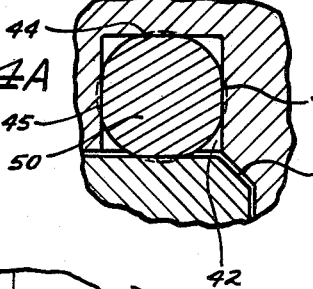
FIG. 4A
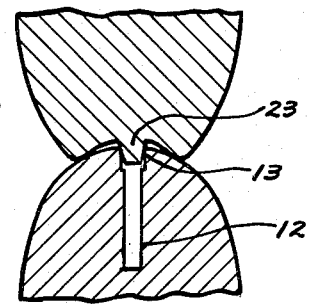
FIG. 6
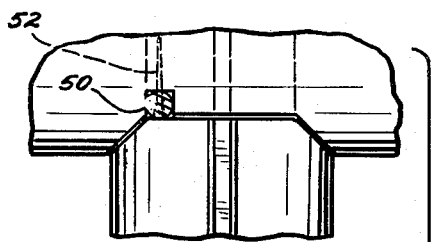
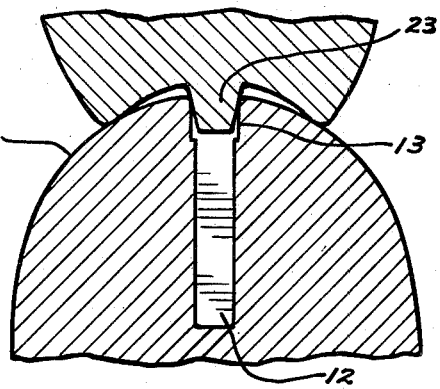
FIG. 7
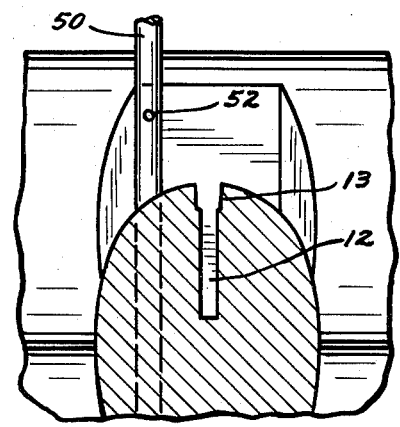
FIG. 8
INVENTOR.
BERTIL L. JOHNSON
BY
ATTORNEYS

United States Patent Office

3,189,950
Patented June 22, 1965

3,189,950
CONNECTING STRUCTURE FOR TIMBERS
Bertil L. Johnson, 4437 Upton Ave. S., Minneapolis, Minn.
Filed Nov. 29, 1961, Ser. No. 155,725
2 Claims. (Cl. 20—4)

This invention relates to an improvement in the construction of a structure from natural logs and particularly with reference to natural logs which have been turned or shaped to be uniform. More specifically the improvement herein has to do with the treatment or preparation of natural logs for the mating and interfitting of said logs in such a manner as to form a structure of weather tight joints whereby caulking or sealing of the joints is made unnecessary. The improvement herein also relates to forming a unitary structure in which the mating portions forming weather tight joints will not be adversely affected or broken by the normally responsive nature of said logs to seasonal atmospheric changes or weather changes generally.

It is an object of this invention therefore to provide a building structure of natural logs, which logs have been fitted together to form a weather sealed structure.

It is a further object of this invention to provide a structure of natural logs whereby the connecting portions of the logs both in their crisscross relation and in overlying one another longitudinally cooperate in effecting locking engagement and in forming a weather tight seal throughout the entire structure.

It is another object of this invention to provide for a mating relation between logs having different cross sectional forms for an intermingling or interchange of such logs if desired.

It is also an object of this invention to provide for a locking engagement of said logs to stabilize the vertical relation of said logs one with another and to provide a substantial anchorage for the roof section of the structure formed.

These and other objects and advantages of the invention will be fully set forth in the following description made in connection with the accompanying drawings in which like reference characters refer to similar parts throughout the several views and in which:

FIG. 1 is a partially exploded view in perspective showing a fragmentary assembly of applicant's structure;

FIG. 2 is a fragmentary view of applicant's structure in vertical section;

FIG. 3 is a fragmentary plan view taken on line 3—3 of FIG. 1 as indicated by the arrows;

FIG. 4 is a view in horizontal section taken on line 4—4 of FIG. 1 as indicated by the arrows;

FIG. 4A is a fragmentary enlargement in horizontal section of a portion of the view in FIG. 4;

FIGS. 5 and 6 are fragmentary views in vertical section showing in steps the mating or assembling of portions of applicant's structure, and FIG. 7 is an enlargement of the view in FIG. 6;

FIG. 8 is a fragmentary composite view partially in vertical and partially in horizontal section showing a detail of structure;

FIG. 9 is a fragmentary composite view in side and end elevation showing a modification of the form of a log in applicant's structure; and FIG. 10 is a fragmentary view in horizontal section showing a particular detail of construction.

Referring to the drawings and with particular reference to FIG. 1, a plurality of logs 10 are shown in perspective in assembled relationship. The same reference characters indicate corresponding parts throughout the description herein. Applicant's logs may take different cross sectional forms as may be desired, such as having parallel sides as indicated in FIG. 9, being substantially circular in form, having a convex surface at one side and a flat opposing surface at the other side or being substantially oval or elliptical in form, as indicated in FIG. 1. Although the oval form of applicant's log 10 is herein described, applicant's logs are so constructed as to be interchangeable if desired in mating with one another to form a structure. The width or thickness of a log will be established by what is required for insulation purposes and the height of a log will be proportional to the thickness. The logs will otherwise be subject to uniform preparation.

Applicant's log 10 comprises in transverse section, side walls 15 and 16 of substantially uniform convex curvature and a convex crown or upper portion 11. Cross sectional dimensions of applicant's log 10 have been found to be satisfactory to be on the order of eight inches in width and ten inches in height.

Extending longitudinally of said crown 11 is a vertical slot 12 running centrally inwardly of said log to the core thereof or for a distance of approximately one-half the height of said log. The upper portion 13 of said slot is of increased width with the side portions thereof forming substantially a U-shaped opening into said slot. Said upper slot portion is here shown being offset somewhat relative to the remainder of said slot having shoulders formed therebetween. Longitudinally said slot will stop short of the exposed or outer end portion of said log, as indicated in FIG. 1.

The base portion of said log is in the form of a longitudinal groove 20 concave in cross section and having a curvature having a radius somewhat less than the radius of said crown 11 and longitudinally extending side edge portions 21 and 22 at either side of said groove are well defined. Extending centrally outwardly of said groove 20 is a tongue or rib 23 in vertical alignment with said slot 12 and of a width to be nicely disposable into said slot 12 and more particularly into said upper portion 13 of said slot 12 to engage the edge or lip portions thereof as indicated in FIGS. 5–7. Said rib is somewhat wedge-shaped in cross section having tapered sides.

Formed adjacent one end of said log 10 in the lower portion thereof is a transverse notch 27. Said notch will be formed at the point of intersection of the logs 10 in forming a building structure. As will be hereinafter indicated, said notch is so formed that logs of different cross sectional form may interchangeably interfit one with another. Said notch 27 comprises a channel 28 having parallel side walls 29 and 30 and a concave top or upper surface 31 having a curvature to very nicely mate with the curvature of said crown 11.

Formed at either side of said log 10 and recessed therein to intersect with channel 28 and to be of the same width as said channel are vertical sides 33 and 35. From the vertical lines of intersection of said sides 33 and 35 with said channel 28 relative to said walls 29 and 30, as indicated in FIGS. 1 and 3, the adjacent wall portions of said log 10 are beveled outwardly forming beveled wall portions 37, 38, 39 and 40. Thus it is seen that said notch 27 forms a saddle to overlie the upper portion of the log crisscrossed therebelow whereby the notch 27 fits over and mates with the vertical walls 33 and 35 and the connecting crown portion therebetween. Said walls 33 and 35 and the sides 29 and 30 have substantially the same height.

At one side of said notched portion of said log 10 and more specifically recessed within the wall 33 to intersect said channel 28 is a vertical open-ended open-faced groove 42 shown here to be rectangular in transverse section having an inner wall 44 and parallel side walls 43, and 45. Said wall 45 forms an upward extension of the wall or side 30 of said notch 27. Said groove is in vertical alignment with the longitudinal edge portion 21.

With the logs 10 mounted in crisscross relation, said grooves 42 in each of the logs 10 will be in vertical alignment with one another to form a continuous groove. The invention herein also embodies the concept of having a plurality of grooves in said notched portion of said log 10 such as having four grooves identical with said groove 42 and respectively spaced at the ends of the walls 33 and 35. However in the present embodiment only one groove 42 is shown located so that with the logs in crisscross relation it is located at the point of the inside corner of the structure formed, and as will hereinafter be indicated, this is sufficient to provide a weather seal or weather barrier. Thus as the logs 10 are mounted in crisscross relation, with reference to FIG. 1, successive of said grooves 42 are at alternate ends of the vertical side 33. The sides 30 and 29 of the notch 27 alternately overlie the open sides of the grooves 42 of said crisscrossed logs.

With the logs 10 in crisscross relation and the grooves 42 in vertical alignment, a pin or peg 50 is driven into said aligned grooves. With said grooves 42 being square in cross section, said peg 50 is preferably cylindrical in form of a diameter slightly larger than the width of said groove whereupon by being driven into said groove 42 the sides of said peg will become compacted, as indicated in FIG. 4A, at its points of tangency with the sides or walls of said groove. As a practical thing said peg 50 will be of a length to extend through four to six logs from the midpoint of the groove 42 of one log to a similar point of the log at its other extremity. It is seen that said peg 50 is in vertical alignment with said longitudinal edge portion 21 and that it intersects an extension of an adjacent portion of the same, as indicated in FIG. 2.

With reference to FIG. 8, a spike 52 or an equivalent is driven through the peg 50 to secure it to the inner face or wall 44 of the groove 42 of each of the logs 10 in crisscross relation. Thus said logs are secured against vertical separation and longitudinal movement to in effect make the building structure an integral structure effectively tied together.

The specific features of the secured peg and groove construction provides a substantial anchorage for the overlying roof. Normally the roof is anchored to the top course of logs with reliance being placed on the weight of the logs and particularly of the roof for anchorage. With applicant's construction the entire structure is in effect tied to the roof and provides anchorage for the roof which safely secures the roof against any severe atmospheric disturbance short of the entire structure as an integral thing being disturbed.

*Operation*

As indicated in the above description, applicant's logs 10 are formed to interfit transversely in crisscross relation and longitudinally as well so that the interfitting portions form a complete weather barrier.

In their crisscross relation, the notch portions 27 of successive logs interfit one another with the channel 28 fitting as a saddle over the crown and adjacent vertical sides 33 and 35 therebelow. The beveled portions 37–40 of each of said logs, with respect to any one log, are engaged or mated in vertical overlapping relation partially by the log therebelow and the remainder by the log thereabove, as illustrated in FIG. 1. The grooves 42 are in vertical alignment and the peg 50 is driven to be disposed in said aligned grooves. Where said peg is piked to adjacent logs as described, it will have to be positioned in the bottommost log and then spiked to the individual logs as they are successfully mounted in position. The same weather seal is secured as with the peg being driven through the groove 42 after the logs are mounted one upon the other. With the peg having a somewhat larger diameter than the cross sectional dimension of said groove 42, said peg is compacted against each side or wall of said groove at the point of tangency therewith to form a weather tight seal at what is here indicated as the inside corner of the structure.

Relative to said logs 10 in their longitudinal relation with one another, the alternate of said logs overlie one another longitudinally. The longitudinal edge portions 21 and 22 at either side of the concave groove 20 of each of said logs rest on the shoulders of the log therebelow at either side of the slot 12 due to the differences in the radii of the adjacent surfaces. The tongue 23 is disposed in the adjacent groove portion 13. The slot 12 is a deep slot. Similar slots of a shallow nature are commonly in use to prevent twisting and warping of the log. However the applicant's slot in extending as to the core of the log performs an entirely new funciton in providing a yielding in the portions of the log at either side of the slot. The weight of one log upon another and the buildup of this weight angled inwardly from the shoulders of each log causes an angular squeezing pressure against said yielding portions of said log at either side of said slot to narrow the gap of the slot portion 13 if necessary to the point of tight engagement between the sides of said slot portion 13 and either side of said tongue 23.

The radius of said groove 20 being less than the radius of the crown 11 results in contact only of the longitudinal edge portions 21 and 22 with the log below. Thus with there being only a thin line of contact, a positive weather seal contact is made. With reference to the contact made between said tongue 23 and the sides of the slot portion 13, the walls of the slot portion 13 are substantially parallel. Said tongue is tapered or wedge-shaped in cross section. Thus the sides of said tongue 23 and the respective sides of said slot portion 13 have substantially an angular relation toward one another whereby when the sides of said slot engage the sides of said tongue, as indicated in FIGS. 6 and 7, there are points of contact only under considerable pressure which makes for a positive weather seal contact.

The edge portion 21 is in line with the groove 42 and the peg 50 therein. Thus the end of said edge portion 21 adjacent said peg 50 terminates in a weathertight contact with said peg forming a portion of an overlying wall surface of said peg. This prevents any possible leakage of air through said groove 42, as is quite clearly indicated in FIGS. 4 and 4A.

The longitudinal edges 21 and 22 and the tongue 23 with the mating or engaging portions of the slot portion 13 form a horizontal weather barrier. The groove 42 and the compacted peg 50 therein forms a vertical weathertight barrier cooperating directly with the horizontal weather barrier at the point of its contact with the longitudinal edge porion 21. The weather barrier thus formed at the inner corner of construction has been found to be very satisfactory.

The slot 12 and the tongue 23 stop short of the exposed end of the log and extend only to the area of the transverse notch 27 as indicated.

With reference to FIG. 9, another form of a log is shown indicated generally by the reference character 65 and which is identical in construction to the log 10 having a transverse notch 72, a crown 66 having a slot 67 therein, a concave groove 68 in its base portion with a tongue 69 and longitudinal edge portions 70 and 71 at either side of said groove, and in connection with said notch a vertical groove 73. The only point of difference lies in said log 65 having flat parallel sides at either end of said notch instead of having recessed convex sides as with said log 10. Thus there are no beveled side portions adjacent either outer end of said notch 72.

Insofar as assembly is concerned, the assembly of the logs 65 is the same as above described and said log is interchangeable with said log 10, said transverse notches being of the same dimensions. Logs of different cross sectional form are uniform except as to the extent of the beveled portions, such as 37–40, but whether these portions are greater or lesser, in width they will accommodate one another, and whether said beveled portions are present or not, the transverse notches will mate.

With reference to FIG. 10, an application of applicant's structure is shown in connection with what might be a portion of a window or door jamb construction 76. The reference character 75 indicates an end portion of a log having grooves 80 therein identical with said grooves 42. Said grooves are in transversely spaced relation with their open sides facing oppositely and respectively overlying said open sides are the inside casing 77 and the outside casing 78. Said casing members will be secured in a conventional manner independently of said log 75. Compacted into said grooves 80 are pegs 82 identical to the pegs 50 described. The casings have weathertight engagement with said pegs 82 and any vertical sliding movement of the logs due to weather conditions is thus provided for without a breaking of a weather seal.

Thus it is seen that I have provided a substantial improvement in a natural log structure forming a complete weather barrier without the use of caulking materials or gaskets which at best are not permanent due to the swelling and shrinking of the logs through the various seasons of the year. Attention is again directed to the use of the round peg compacted in a square groove for a positive weather seal at the points of tangency of said peg relative to said groove and the compression of spaced side portions of said log into a tight seal engagement with adjacent portions of a rib and overlying the same spaced parallel lines of contact adjacent either side thereof. In the main areas of contact are points or lines of contact rather than substantial areas or surface portions of contact, thus assuring a positive and tight engagement between adjacent members.

It will of course be understood that various changes may be made in the form, details, arrangement and proportions of the parts, without departing from the scope of applicant's invention which, generally stated, consists in a structure capable of carrying out the objects above set forth, in the parts and combinations of parts disclosed and defined in the appended claims.

What is claimed is:

1. In a building structure a plurality of similar superposed logs interfitted in crisscross relation, each of said logs comprising an upper portion forming a crown having a convex curvature in cross section,
    a longitudinally extending slot centrally of said crown having parallel side portions,
    a bottom portion of said log having a longitudinally extending concavely curved groove formed therein vertically aligned with said slot and having a radius substantially shorter than the radius of said crown and having longitudinal edge portions defined at either side of said groove,
    a tongue tapered in vertical cross section extending outwardly centrally longitudinally of said concave groove,
    said lower portion of said log having a transversely extending notch therethrough having its channel extending upwardly substantially one-half of the height of said log,
    said log having a vertical groove at one side thereof within one end portion of said notch, said groove having an open side,
    said vertical grooves in said plurality of logs with said logs being in superposed crisscross relation being in vertical alignment with one another whereby with each notched portion of a log interfitting with the upper half of the log directly therebelow at right angles thereto, a side of said transverse notch overlies the open side of the vertical groove of said interfitted logs directly therebelow forming a side enclosed vertical groove,
    said concave groove of each log overlying the longitudinally extending slot of the log therebelow, with said tapered tongue extending into and being wedged within said slot to have a line engagement with the upper edge portions of said slot, and said longitudinal edge portions being disposed on said crown at either side of said slot having a line engagement with the surface of said crown, and
    a pin disposed into said vertical groove having weather sealing engagement with the sides of said groove.

2. In a building structure wherein walls are formed of logs meeting at an angle to form a corner, logs of said walls alternating in an intersecting superposed relation each comprising
    a transverse saddle notch in the lower portion thereof extending upwardly for a height substantially one-half of the height of said log and having flat parallel vertical sides with an upper arcuate connecting surface,
    vertical portions recessed at either side of said log forming vertical faces parallel with one another partially intersecting said notch,
    the sides of said notches being beveled from the line of intersection of said vertical faces and the sides of said transverse notch,
    a vertical open-ended groove recessed in one of said vertical faces having one wall in common with a side of said transverse notch,
    the alternate of said logs overlying one another having identical of said vertical open-ended grooves at alternate ends of their respective like faces whereby said vertical open-ended grooves upon the criss-cross interfitting of said logs come into vertical alignment with one another and a side of said transverse notch of each of said logs respectively overlying the open side of each of said grooves of the logs interfitting with said last mentioned logs, and said beveled edge portions of said respective logs come into mating relation with one another, and
    a peg disposed through a plurality of aligned of said vertical grooves designed to have a line engagement with the sides of said grooves to form a weather sealed contact therewith.

References Cited by the Examiner

UNITED STATES PATENTS

| | | | |
|---|---|---|---|
| 1,300,671 | 4/19 | Still | 20—92 |
| 1,425,166 | 8/22 | Bergmann. | |
| 2,040,110 | 5/36 | Tahvonen. | |
| 2,272,507 | 2/42 | Bullard | 20—92 |
| 2,525,659 | 10/50 | Edwon | 20—4 |

FOREIGN PATENTS

| | | |
|---|---|---|
| 41,122 | 3/25 | Norway. |
| 68,058 | 4/42 | Norway. |
| 71,856 | 11/48 | Norway. |
| 270,008 | 11/50 | Switzerland. |
| 944,089 | 8/56 | Germany. |

EARL J. WITMER, *Primary Examiner.*

WILLIAM I. MUSHAKE, *Examiner.*